Aug. 14, 1945.   F. M. ALLEN ET AL   2,382,375

FLEXIBLE PIPE COUPLING

Filed Jan. 9, 1942

FRANK M. ALLEN
CLYDE B. TAYLOR  INVENTORS
BY
ATTORNEY.

Patented Aug. 14, 1945

2,382,375

UNITED STATES PATENT OFFICE 2,382,375

FLEXIBLE PIPE COUPLING

Frank M. Allen, Azusa, and Clyde B. Taylor, Long Beach, Calif., assignors to The All-Flex Corporation, Los Angeles, Calif., a corporation of California Application January 9, 1942, Serial No. 426,207

3 Claims. (Cl. 285—97.3)

This invention relates to pipe joints or couplings, and more particularly to pipe couplings of the type which interconnect two pipe elements for rotary movement with respect to each other and yet maintain a fluid-tight joint therebetween to prevent leakage. This is the type of pipe coupling known in the trade as a "swing joint."

An object of the present invention is the provision of a pipe joint of the general character indicated which is of such improved design that it can be relied upon to prevent leakage of fluid heretofore difficult or impossible to confine in a flexible conduit, without, however, impairment to the flexibility of the coupling.

Another object of our invention is to provide, in a flexible coupling of the character described wherein two pipe elements are interconnected for rotary movement with respect to each other about their common axis, means for compensating for shifting of either pipe section with respect to the other to such an extent that a material degree of such shifting can occur in either of two directions without permitting leakage to develop.

A more detailed object in this connection is a provision of a flexible pipe joint which includes at least two packings mounted independently of each other, one of which is confined between radially flat surfaces on the two opposed pipe elements, with at least one of which it makes slipping engagement so as to permit relative rotary motion between the pipe elements, and the other of which packings is similarly confined between concentric cylindrical surfaces on the two opposed pipe elements. With this object in view the present application constitutes a continuation in part of our copending application, Serial No. 317,740, filed February 7, 1940, which matured to Patent No. 2,269,431 on January 13, 1942.

It is a further object of our present invention to design and arrange packers in such a manner that each is definitely anchored to one of the confining walls associated therewith, thus predetermining which face of the packer will be the "slip face" thereof, and that the slip faces of the two packers are disposed in planes extending angularly with respect to each other thereby permitting a material degree of relative movement of the pipe element in either of those planes without hazard to the fluid-tight nature of the joint.

The invention possesses other objects and valuable features, some of which, with those enumerated, will be set forth in the following description of the preferred embodiments illustrated in the drawing accompanying and forming part of the specification. It is to be understood that we do not limit ourselves to the showings made by the said drawing and description as we may adopt variations of the preferred forms within the scope of our invention as defined by the claims.

Referring to drawing.

Figure 2:
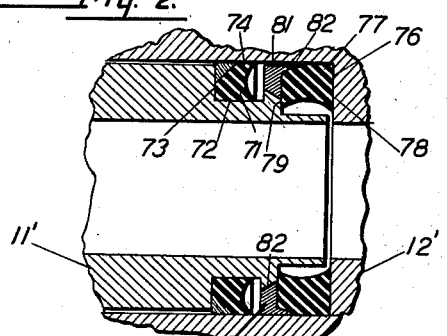
Figure 2 is a view similar to Figure 1, partially broken away to reduce its size, illustrating a slightly modified form of joint embodying the principles of our invention.

Figures 3, 4, 5, and 6 are each similar to Figure 2, and each illustrates a further modified form of joint embodying the principles of the present invention.

In terms of broad inclusions, the flexible pipe coupling or "swing joint" of the present invention is adapted to interconnect two portions of a conduit such as a pipe line in such a manner as to maintain constant communication between the respective bores of the two portions without leakage therebetween, and yet permit relative rotary motion of one portion with respect to the other so as to introduce flexibility to the conduit. Even in those couplings which are machined with great care to exact dimensions a certain amount of looseness or "play" will almost inevitably be present, permitting a limited amount of movement to occur between the two portions of the joint other than the rotary movement for which they are designed, such play taking the form of either axial movement, i. e. movement of one portion toward or away from the other in a direction parallel to their axis of rotation, or radial movement, i. e. movement of one portion with respect to the other in a direction resulting in misalignment of their axes, or a combination of both. Particularly in view of the high pressure and/or low viscosity of liquids that joints of this general nature are frequently called upon to carry, even exceedingly small lateral or axial shifting of the joint sections in the past has been found to disturb the packing of the joint to such an extent that leakage develops; and it is toward the correction of this inherent fault of more conventionally constructed swing joints that the present invention is directed.

Figure 1:
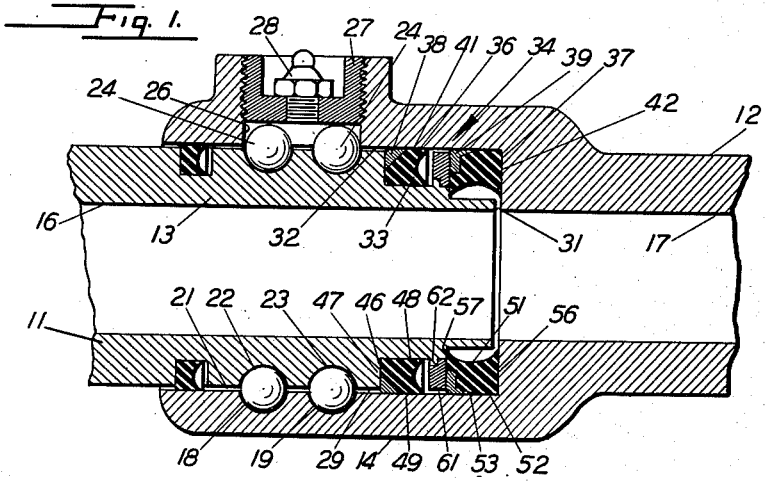
Figure 1 is a longitudinal, medial sectional view taken through a pipe joint embodying the principles of our present invention.

Referring first to that embodiment of our invention which is illustrated in Figure 1, the joint comprises cooperating male and female pipe sections 11 and 12 respectively, the end 13 of the male section 11 being revolubly disposed within the belled end 14 of the female section 12, and the two sections being in coaxial relation and having their bores 16 and 17, respectively, in communication with each other. Preferably a pair of ball races 18 and 19 are formed in the bore 21 of the bell 14; and cooperating races 22 and 23, respectively, are provided in register therewith in the outer circumferential wall of the end 13 of the male pipe section 11, to accommodate antifriction balls 24. Inasmuch as these balls 24 fit within the registering races or grooves, they serve not only to retain the two pipe sections 11 and 12 accurately in line and permit relative rotation therebetween with a minimum of friction, but they also operate to retain the sections against axial movement with respect to each other, i. e., they serve to hold the sections together in operative relationship. They are inserted into the races after the two pipe sections have been placed in proper relative position, through an opening 26 in one side of the bell 14; and after insertion of the balls 24, a plug 27 is threaded into the opening to prevent escape of the balls. The plug 27 is provided with a fitting 28, preferably of conventional design, for use in supplying lubricant under pressure not only to the ball races 18, 19, 22 and 23 but also to the interstice 29 between the two pipe sections 11 and 12.

This interstice comprises a radial portion 31 and a circumferential portion 32; and we have found that a highly advantageous location for the recess 33 for the accommodation of the packing 34 is at the intersection of these two portions 31 and 32 of the interstice 29. The recess 33 preferably is formed by chambering the outer circumferential surface of the male pipe section 11 at the extreme inner end thereof, so that any fluid entering the recess from the bore of the conduit into which the joint is connected would have to enter by way of the radial portion 31 of the interstice; and from the recess 33 the only means of egress is through the circumferential portion 32 of the interstice. It is for the purpose of preventing the escape of fluid under pressure through the interstice 29, i. e., between the sections 11 and 12 of the joint, that the packing 34 is provided.

The packing 34 comprises two separately mounted and independently operating packers 36 and 37, respectively. Each of these packers is an annular member and is of compound formation since each comprises both a relatively rigid annulus, or backing ring 38, 39, respectively, and a relatively resiliant deformable annulus 41, 42, respectively. In each case the non-deformable annulus 38, 39 is preferably composed of suitable metal, preferably brass, whereas the deformable annulus 41, 42 is composed of suitable resilient material such as rubber or, in these cases where the liquid is to be confined is a solvent of or has other detrimental effects upon rubber the deformable annuli are composed of synthetic rubber such as that known to the trade as "Neoprene."

The outer packer 36, i. e., the one which is more distant from the bores 16 and 17, is constructed with its working face, i. e., the face which is directed toward the liquid to be confined, on one of the lateral or radial faces, hence this packer "faces" in a direction parallel to the axis of the coupling, and its back face 46 bears against a radial surface 47 on the male coupling member 11, which defines the outer extremity of the packing recess 33. Furthermore, the sides of the packer bear against the circumferential surface 48 and 49, respectively, on the male member 11 and the female member 12 of the coupling.

It is an important aspect of the present invention that the opposite conditions prevail in respect of the inner packer 37. In this instance the operating face 51 faces radially inwards, i. e., the operating face is constructed on the inner circumference of the annular packer and its back face 52 is against a circumferential surface 53 of the female member 12, and the side faces 56 and 57 are radial surfaces. The inner packer 37 is retained against lateral shifting by bearing against a removable annular flange 61 which in turn is retained in its operating position by a relatively narrow flange 62 integral with the male element 11 of the coupling and projecting into the packing recess 33 such a short distance that the outer packer 37 can be deformed sufficiently to pass over it in inserting the outer packer 36 to its operating position.

It is important to observe that each packer 36, 37 makes materially greater contact with one of the elements of the coupling than with the other. That is to say, the outer packer 36 makes contact with the male element 11 throughout the entire area of both its inner circumferential face 48 and its back face 46 whereas this packer makes contact with the female coupling element 12 throughout the area of only one face of the packer, i. e., its outer circumferential face 49. Accordingly, when pressure is imposed upon the packer the greater area of its contact with the male coupling element will cause it to adhere to the male element 11 with the result that the two surfaces 48 and 46 of the outer packer combined to define what is termed the "anchored face" of the packer, and the other contacting face thereof, i. e., the face 49, will establish sliding contact with the female coupling element and it accordingly is termed the "slip face" of the packer 36. In the case of the inner packer 37, it makes contact throughout the area of the back 53 and one lateral face 56 with the female element 12 and throughout the area of only one face, i. e., the lateral or radial face 57, with the male coupling element and the removable flange 61 carried thereby. Accordingly, the faces 56 and 52 of the inner packer combine to define the anchored face of the packer, whereas the lateral or radial face 57 constitutes the slip face.

It is apparent, therefore, that the slip face 49 of the outer packer 46 is an annular surface extending in a peripheral plane parallel to or coaxially with the direction of flow through the coupling; whereas, on the other hand, the slip face 57 of the inner packer is a radial surface extending in a plane perpendicular to that of the slip face 49 of the outer packer.

The principal significance of this described relationship between the respective slip faces 49 and 57 of the two packers 36 and 37, respectively, is that it compensates for play which might be present in the mechanical joint between the two elements 11 and 12. No matter how carefully the parts may be machined, or how accurately they may be fitted, they must be interconnected sufficiently loosely to permit one to turn with respect to the other; otherwise, the utility of the coupling is negatived, consequently the limitations of practical construction require that there shall be at least a limited degree of play present in the mechanical joint. Such play must take the form of either radial movement or axial movement, or a combination of both, and although in a properly machined and assembled coupling the amount of this play will be exceedingly slight it has been found in the past to disturb the packings to such an extent that leakage of the coupling is most apt to develop. However, in the present instance, since the slip face 49 of the outer packer is in a plane parallel to the axis of the coupling, any axial movement of one coupling element with respect to the other would not disturb the security of the seal established by this packer, inasmuch as it will merely expose another portion of the same cylindrical surface to the slip face 45 without disturbing the packer 49 in any manner whatsoever. On the other hand, since the slip face 57 of the inner packer extends in a radial plane, a material degree of radial shifting of one coupling element with respect to the other can occur without any disturbance whatsoever of this inner packer. Consequently, when the two packers constructed and assembled as hereinabove described are both present, if either of the coupling elements 11 or 12 is disturbd from the position in which it should theoretically be retained by the anti-friction balls 22 and 23, either radially or axially, at least one of the packers 36 or 37 will remain substantially undisturbed and fully as efficient as before in safeguarding the coupling against leakage.

In the modifications illustrated in Figures 2 to 6 inclusive the same principle of operation is assured by maintaining the same relative arrangement of the inner and outer packers, but in each case minor differences of construction and details of the manner of the mounting of the packing occur which distinguish them from the modification already described.

For example, in the modification illustrated in Figure 2 the anchored face of the inner packer 71 is presented by the combined inner annular face 72 and the radial surface or back 73, thus predetermining the slip face of the packer 71 will be the outer circumferential surface 74. In the case of the inner packer 76, the outer circumferential surface 77 and the radial surface 78 cooperate to present the anchored face of the packer, thus predetermining the opposite radial surface 79 of the packer will be its slip face. However, inasmuch as the removable annular flange 81 against which the inner packer 56 of Fig. 2 rides is formed integrally with the backing ring 82 of that packer, this entire ring 81 also will remain stationary with respect to the female joint element 12' and move with respect to the male element 11' with the result that another portion of the slip face of the inner packer 56 extends at an oblique angle from the portion 79 thereof, as indicated at 81. The oblique nature of this inner circumferential face of the annular flange 81 will, under certain circumstances of operation, tend to increase the efficiency of the packing in preventing leakage inasmuch as when fluid pressure is imposed upon the inner packer 76, the tendency will develop for the packer to crowd over to the left, as viewed upon Figure 2, thus tending to increase the tightness of the joint between the inner circumferential surface of the ring 81 and the outer circumferential surface of the flange 82 with which it cooperates, and with respect to which it rotates.

Figure 3:
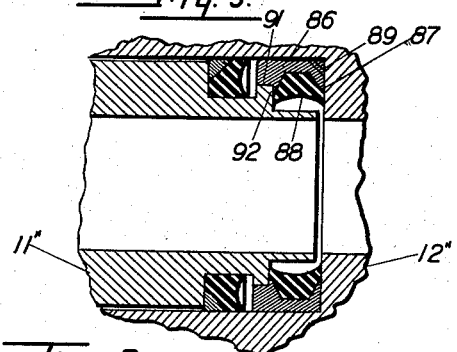

The modification of Figure 3 is much the same as that of Figure 2 with the exception that in this construction the backing ring 86 is extended all the way across the back of the inner packer 87, so that the resilient annulus 88 thereof is confined between two tapered lateral annular flanges 89 of the backing ring 86. This construction results in making the lateral edges of the resilient annulus 88 considerably thinner and hence more flexible with the result that they are more readily flexed laterally outward when fluid pressure is imposed upon the inner, cupped face of the resilient annulus. Accordingly, this packing is more sensitive to increase in fluid pressure in making the packing establish a more highly efficient fluid-tight seal, with the result that this form of packing is best adapted for use with fluids at relatively low pressure.

In this modification, however, the inner circumferential surface 91 of the removable supporting flange which is formed integral with the backing ring 86 of the inner packer 7, is cylindrical and makes sliding contact with a cylindrical surface on the outer face of the cooperating flange 92 on the male element 11'', thus eliminating all possibility of seizing such as that which might develop where the tapered juncture between these two surfaces is employed.

Figure 4:
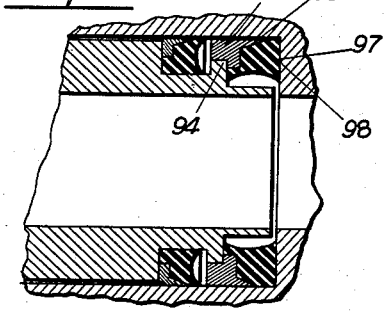

In Figure 4 this same type of interconnection between the removable supporting flange 93 and the non-removable flange 94 is employed, i. e., these surfaces are cylindrical. However, the backing ring 96 of the inner packing 97 extends only part way across the back of the deformable annulus 98, similarly to the corresponding element of the modification illustrated in Figure 2.

Figure 5:
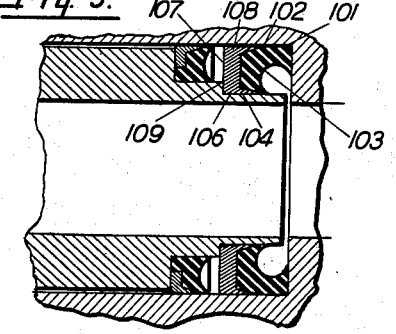

In Figure 5 still greater flexibility of the edges of the deformable annulus 101 of the inner packer 102 is secured by forming these edges still thinner than those of the annulus 88 hereinabove described. This is accomplished by curving the operating face 103 about a smaller radius of curvature. The slip face 104 of the inner packer 101 is the combination of the inner circumferential surface 106 of the packer and a small portion of the back 107 which is a flat radial surface. Another slight difference existing between this modification and those previously described is that whereas the backing rings 108 and the removable flange for the support thereof are again formed integrally. They do not make contact with a flange protruding from the outer circumference of the seal element of the joint, but instead make engagement with the radial surface of a shoulder 109, the extreme outside diameter of which coincides with the inside diameter of the outer packing 111.

Figure 6:
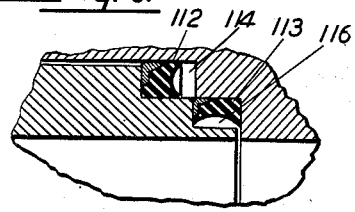

In the modification of Figure 6 the outer and inner packing 112 and 113, respectively, are of different diameters, the outside diameter of the inner packing 113 substantially coinciding with the inside diameter of the outer packing 112. Accordingly, the two packers are seated within individual recesses 114 and 116, respectively, or within offset portions of the same recess. In other respects these packings 112 and 113 are similar to those of the previously described modification.

We claim:

1. In a swivel pipe coupling of the character described, a pair of pipe elements, means interconnecting said pipe elements in co-operative relationship for rotation with respect to each other, and packing means disposed within a recess between said pipe elements, said packing means comprising a pair of packers, each of said packers having a face making contact with each of said pipe elements, means associated with each of said packers for predetermining which of said faces thereof shall slip with respect to the pipe element contacted thereby, and said respective slip faces of said two packers being in planes disposed angularly with respect to each other whereby displacement of either of said pipe elements with respect to each other would have to be in at least two different directions before such displacement would disturb said engagement of both of said slip faces.

2. A swivel pipe coupling comprising a pair of intercommunicating pipe elements interconnected for rotary movement with respect to each other, at least one of said elements being chambered to present a recess defined by at least one wall on each of said pipe sections disposed in planes extending angularly with respect to each other, and a pair of packers mounted within said recess, each of said packers having an anchored face and a slip face and the respective slip faces of said packers slidably engaging said angularly disposed walls of said recess.

3. A swivel pipe coupling comprising a pair of intercommunicating pipe elements interconnected for rotary movement with respect to each other, at least one of said elements being chambered to present a recess defined by at least one wall on each of said pipe sections disposed in planes extending angularly with respect to each other, and a pair of packers mounted independently of each other within said recess, each of said packers having an anchored face and a slip face and the respective slip faces of said packers slidably engaging said angularly disposed walls of said recess.

FRANK M. ALLEN.
CLYDE B. TAYLOR.